(12) United States Patent
Komarov et al.

(10) Patent No.: US 11,456,858 B2
(45) Date of Patent: Sep. 27, 2022

(54) BIDIRECTIONALLY LINKED BLOCKCHAIN STRUCTURE

(71) Applicants: Bundesdruckerei GMBH, Berlin (DE); TECHNISCHE UNIVERSITÄT BERLIN, Berlin (DE)

(72) Inventors: Ilya Komarov, Berlin (DE); Manfred Paeschke, Wandlitz (DE); Peter Janacik, Cologne (DE)

(73) Assignees: BUNDESDRUCKEREI GMBH, Berlin (DE); TECHNISCHE UNIVERSITAT BERLIN, Berlin (DE)

( * ) Notice: Subject to any disclaimer, the term of this patent is extended or adjusted under 35 U.S.C. 154(b) by 295 days.

(21) Appl. No.: 16/754,490

(22) PCT Filed: Sep. 20, 2018

(86) PCT No.: PCT/EP2018/075507
§ 371 (c)(1),
(2) Date: Apr. 8, 2020

(87) PCT Pub. No.: WO2019/076574
PCT Pub. Date: Apr. 25, 2019

(65) Prior Publication Data
US 2020/0344043 A1 Oct. 29, 2020

(30) Foreign Application Priority Data
Oct. 19, 2017 (DE) .................. 10 2017 218 736.0

(51) Int. Cl.
*H04L 9/06* (2006.01)
*G06F 21/60* (2013.01)
(Continued)

(52) U.S. Cl.
CPC .......... *H04L 9/0637* (2013.01); *G06F 21/602* (2013.01); *G06F 21/64* (2013.01);
(Continued)

(58) Field of Classification Search
CPC ... H04L 9/0637; H04L 9/0825; H04L 9/3073; H04L 2209/38; G06F 21/602; G06F 21/64
See application file for complete search history.

(56) References Cited

U.S. PATENT DOCUMENTS 9,608,829 B2 3/2017 Spanos et al.
9,979,718 B2 5/2018 Kurian
(Continued)

FOREIGN PATENT DOCUMENTS

WO WO-2016/161073 A1 10/2016

OTHER PUBLICATIONS

International Search Report PCT/ISA/210 for International Application No. PCT/EP2018/075507 dated Jan. 1, 2019.
(Continued)

*Primary Examiner* — Ayoub Alata
(74) *Attorney, Agent, or Firm* — Harness, Dickey & Pierce, P.L.C,

(57) ABSTRACT

The invention relates to a method for the tamper-proof storing of data in a bidirectionally linked blockchain structure. The method comprises the steps of creating an additional block $B_i$ to extend the blockchain structure which comprises the data to be stored as payload data creating a bidirectional linking of the additional block $B_i$ to a predefined number of preceding blocks, wherein creating the bidirectional linking comprises performing a backward linking of the additional block to the predefined number of preceding blocks and performing a forward linking of the predefined number of preceding blocks to the additional block.

19 Claims, 7 Drawing Sheets

(51) Int. Cl.
  *G06F 21/64*  (2013.01)
  *H04L 9/08*  (2006.01)
  *H04L 9/30*  (2006.01)
  *H04L 9/00*  (2022.01)

(52) U.S. Cl.
  CPC .......... *H04L 9/0825* (2013.01); *H04L 9/3073* (2013.01); *H04L 9/50* (2022.05)

(56) References Cited

U.S. PATENT DOCUMENTS

| | | | |
|---|---|---|---|
| 10,192,073 | B2 | 1/2019 | Marin |
| 10,805,067 | B1* | 10/2020 | Griffin .................. H04L 9/0637 |
| 2016/0028552 | A1* | 1/2016 | Spanos ................. H04L 9/3297 |
| | | | 713/178 |
| 2016/0261690 | A1 | 9/2016 | Ford |
| 2017/0070890 | A1 | 3/2017 | Luff et al. |
| 2017/0116136 | A1 | 4/2017 | Macnicol et al. |
| 2017/0346639 | A1* | 11/2017 | Muftic .................. H04L 9/3247 |
| 2017/0352219 | A1 | 12/2017 | Spanos et al. |
| 2017/0366353 | A1* | 12/2017 | Struttmann ........... H04L 9/0618 |
| 2018/0219669 | A1* | 8/2018 | Chen ..................... H04L 9/3236 |
| 2018/0367518 | A1 | 12/2018 | Singh et al. |
| 2019/0073646 | A1 | 3/2019 | Wright et al. |
| 2019/0103975 | A1 | 4/2019 | Jacobs et al. |
| 2019/0122186 | A1 | 4/2019 | Kano et al. |
| 2020/0057869 | A1 | 2/2020 | Wilke et al. |
| 2020/0118068 | A1 | 4/2020 | Turetsky et al. |
| 2020/0235913 | A1 | 7/2020 | Wilke et al. |
| 2020/0259634 | A1 | 8/2020 | Wilke et al. |
| 2020/0287707 | A1 | 9/2020 | Wilke et al. |
| 2020/0344043 | A1 | 10/2020 | Komarov et al. |
| 2021/0352134 | A1 | 11/2021 | Bjontegard |

OTHER PUBLICATIONS

Written Opinion of the International Searching Authority PCT/ISA/237 for International Application No. PCT/EP2018/075507 dated Jan. 1, 2019.
A. Narayanan et al., 'Bitcoin and Cryptocurrency Technologies' Sections 1.2, 2.4, 3.4, and 3.5, retrieved on the internet at https://web.archive.org/web/20170602075829/https://d28rh4a8wq0lu5.cloudfront.net/bitcointech/readings/princeton_bitcoin_book.pdf, Feb. 2016.
J. Garay et al., 'The Bitcoin Backbone Protocol: Analysis and Applications' *International Association for Cryptological Research*, Jan. 2016, pp. 1-37.
Y. Sompolinsky et al., 'SPECTRE: Serialization of Proof-of-work Events: Confirming Transactions via Recursive Elections' retrieved on the internet at https://web.archive.org/web/20170710152154/https://eprint.iacr.org/2016/1159, Jul. 2017.
International Preliminary Report on Patentability for Application No. PCT/EP2018/075507 dated Apr. 30, 2020.
International Search Report PCT/ISN210 for International Application No. PCT/EP2018/058928 dated May 28, 2018.
Written Opinion of the International Searching Authority PCT/ISN237 for International Application No. PCT/EP2018/058928 dated May 28, 2018.
International Preliminary Reporton Patentability dated Dec. 12, 2019, issued in PCT Application No. PCT/EP2O18/058928.
International Search Report PCT/ISA/210 for International Application No. PCT/EP2018/054557 dated Feb. 23, 2018.
Written Opinion of the International Searching Authority PCT/ISA/237 for International Application No. PCT/EP2018/054557 dated Feb. 23, 2018.
International Preliminary Reporton Patentability for PCT Application No. PCT/EP2018/054557 dated Oct. 10, 2019.
Office action dated Feb. 7, 2022 for U.S. Appl. No. 16/617,096.
Notice of Allowance dated Apr. 5, 2022 for U.S. Appl. No. 16/648,479.
Office Action dated Jul. 14, 2021 for U.S. Appl. No. 16/498,134.
Notice of Allowance dated Feb. 2, 2022 for U.S. Appl. No. 16/498,134.
"Block Chain", viewed Mar. 27, 2020, https://en.wikipedia.org/wiki/Block_chain.
"Mastering Bitcoin", Chapter 7, The Blockchain, p. 161.
Nakamoto, "Bitcoin: Peer-to-Peer Electronic Cash System", 2008, (https://bitcoin.org/bitcoin.pdf), p. 1-9.
International Search Report PCT/ISA/210 for International Application No. PCT/EP2018/075507 dated Jan. 11, 2019.
Written Opinion of the International Searching Authority PCT/ISA/237 for International Application No. PCT/EP2018/075507 dated Jan. 11, 2019.
International Search Report PCT/ISA/210 for International Application No. PCT/EP2018/054557 dated Apr. 6, 2018.
Written Opinion of the International Searching Authority PCT/ISA/237 for International Application No. PCT/EP2018/054557 dated Apr. 6, 2018.

* cited by examiner

BIDIRECTIONALLY LINKED BLOCKCHAIN STRUCTURE

CROSS-REFERENCE TO RELATED APPLICATIONS

This application is a national phase under 35 U.S.C. § 371 of PCT International Application No. PCT/EP2018/075507 which has an International filing date of Sep. 20, 2018, which claims priority to German Application No. 10 2017 218 736.0, filed Oct. 19, 2017, the entire contents of each of which are hereby incorporated by reference.

The invention relates to a method and an electronic data storage system for storing data. In particular, the invention relates to a method and an electronic data storage system for the tamper-proof storing of data in a bidirectionally linked blockchain structure.

The possibility to change or even deliberately manipulate digitally coded data in electronic stores poses a technical challenge.

Blockchain structures for protecting data are known from the prior art. These blockchain structures are unidirectionally linked blockchain structures. For example, corresponding blockchain structures are used in order to log transactions of cryptocurrencies, such as the Bitcoin payment system.

A blockchain structure in this case provides an extendible list of data records, which are arranged in blocks. The integrity of the individual blocks is secured in the prior art by a unidirectional linking using cryptographic check values of the individual blocks in the form of hash values. The blocks are linked on account of the fact that each block comprises a cryptographic check value of the previous block inclusive of the cryptographic check value stored in the previous block. In this case each block comprises a check value which is based on the content of all previous blocks. It is therefore difficult to manipulate such a blockchain at a later moment in time, since, in order to do this, not only would an individual block have to be manipulated, but also all subsequent blocks, because the check value of each subsequent block is based, amongst other things, on the block that is to be manipulated. If the block that is to be manipulated is then actually manipulated, its check value thus changes. This altered check value then no longer matches the check values of the subsequent blocks, and therefore the manipulation is identifiable and will be apparent if a check by means of the check values is performed.

Known blockchain structures, however, implement merely a unidirectional linking and thus safeguarding of the data, since only data contents of previous blocks are taken into consideration in the linking. On the basis of the linking, it is thus possible to check whether a previous block of a provided blockchain structure has been manipulated. However, it is not possible to check whether the provided blockchain structure is complete. In particular, it is not possible to check whether part of the blockchain structure might have been cut off. Furthermore, it is not possible to check whether the last block has been manipulated.

When checking and safeguarding blockchain structures, conventional hash methods are also used. Individual blocks of the blockchain structure are linked unidirectionally to one another via hash values. So that such a blockchain structure of blocks linked to one another unidirectionally may be checked for manipulation, all of the information of the individual blocks as well as the hash value of each of the blocks are required. Furthermore, when checking such a blockchain structure it is necessary to start with the first block of the corresponding blockchain structure and to end with the last block.

The object of the invention is to create an improved method for the tamper-proof storing of data.

The object forming the basis of the invention is solved by the features of each of the independent claims. Embodiments of the invention are described in the dependent claims.

Some embodiments relate to a method for the tamper-proof storing of data in an electronic store using a bidirectionally linked blockchain structure. The blockchain structure comprises a plurality of blocks, each comprising payload data and link data, wherein the payload data of each block of the blockchain structure are verifiable by means of the link data of a predefined number of blocks of the blockchain structure to which the corresponding block is bidirectionally linked.

The method comprises the steps of:
providing the bidirectionally linked blockchain structure;
providing the data to be stored;
creating an additional block $B_i$ to extend the blockchain structure which comprises the data to be stored as payload data;
creating a bidirectional linking of the additional block $B_i$ to a predefined number of preceding blocks that precede the additional block in the blockchain structure;
wherein the creation of the bidirectional linking comprises performing a backward linking of the additional block to the predefined number of preceding blocks and performing a forward linking of the predefined number of preceding blocks to the additional block.

The backward linking comprises the steps of:
calculating a check value of the data to be stored;
extracting a number of first groups with check value portions from the check value of the data to be stored, wherein the number of first groups corresponds to the predefined number of preceding blocks;
storing the check value portions of the first groups in a manner distributed in the link data of each of the blocks of the predefined number of preceding blocks according to a distribution scheme, the distribution scheme being dependent on the data to be stored.

Furthermore, the forward linking for each individual block of the predefined number of preceding blocks comprises the steps of:
calculating a check value of the payload data of the corresponding preceding block;
extracting a second group with check value portions from the check value of the payload data of the corresponding preceding block;
storing the check value portions of the second groups in a manner distributed in the link data of each of the additional blocks according to a distribution scheme, the distribution scheme being dependent on the payload data of the corresponding preceding block.

Some embodiments may have the advantage that they make it possible to provide a bidirectionally linked blockchain structure in which the blocks are linked to one another by means of block-dependent bidirectional linking functions. The linking in this case enables a bidirectional checking of the blockchain structure for authenticity and/or manipulation. In this case, the blockchain structure may be checked not only in one direction, but in two directions.

A "blockchain structure" is understood to mean a data structure which forms a blockchain. A "blockchain" is understood to mean an ordered data structure which comprises a plurality of data blocks linked to one another. In particular, a blockchain is understood to mean a database whose integrity, i.e. protection against subsequent manipulation, is safeguarded by storing a check value, such as a hash value, of each previous data record in the subsequent data record. In this case the check value is assigned to the content of the previous data record and characterises it uniquely. If the content of the previous data record is changed, it no longer satisfies the inspection feature, and therefore the change is evident. In the case of known blockchain structures, for example each block of the blockchain is uniquely identified by a hash value and references a predecessor block in the blockchain whose hash value it comprises.

See https://en.wikipedia.org/wiki/Block_chain_(database) and "Mastering Bitcoin", Chapter 7, The Blockchain, page 161 ff. for examples of a blockchain. The concept of blockchains was described for example in 2008 in a White Paper under the pseudonym Satoshi Nakamoto in the context of the Bitcoin cryptocurrency ("Bitcoin: Peer-to-Peer Electronic Cash System" (https://bitcoin.org/bitcoin.pdf)). In this practical example, each block of the blockchain contains, in its header, the hash of the entire previous block header. The order of the blocks is thus uniquely defined, resulting in a chain structure. Due to the linking, thus implemented, of the individual blocks to one another, a subsequent modification of preceding blocks is not possible without also modifying all subsequent blocks.

The security of a blockchain structure may be increased for example in that it is published or generally accessible, and therefore a comparison of an available copy of the blockchain structure with further published or accessible copies of the same blockchain structure is made possible.

A check value for data is a value assigned to the corresponding data, which value uniquely characterises the data in such a way that the integrity of the data may be checked on the basis of the check value. A check value in the form of a checksum for example provides a value that has been calculated from the starting data and is configured to identify at least a bit error in the data. Depending on the complexity of the calculation method for the checksum, more than one error may be identified or also corrected. Known check values or checksums may be based for example on a summing of data values, a calculation of a digit sum, a parity bit, a weighted mean value of the data, or on more complex calculation methods, such as a cyclic redundancy check or the use of a hash function.

For example, a check value comprises a sequence of characters. Numerically, this may be represented as a bit sequence. A check value portion is a partial sequence of the sequence of a check value. Such a partial sequence comprises one or more bits. A group of check value portions is a group of partial sequences of the sequence of a check value. The partial sequences may each comprise the same number of bits or at least partially a different number of bits. For example, a first group of check value portions comprises, every $n^{th}$ bit, for example every 2, 3 or 4 bits, a sequence of a check value starting with the first bit of the sequence, while a second to $(n-1)^{th}$ group of check value portions comprises every $n^{th}$ bit, for example every 2, 3 or 4 bits, the sequence of the check value starting with the second, third, . . . , $(n-1)^{th}$ bit of the sequence.

Distributed storing of a group of check value portions in the link data of a block means storing according to a distribution scheme so that the individual check value portions do not follow each other directly. To identify the check value portions in the link data of the block, it is therefore necessary to know the corresponding distribution scheme.

A distributed storage of a number of groups of check value portions over a plurality of blocks of a blockchain structure describes a storage of the individual groups in the link data of different blocks of the plurality of blocks. The individual groups, again, may be stored distributed in each case in the link data of the corresponding block.

Payload data refers to the data to be stored in the blocks of the blockchain structure in a tamper-proof manner. Payload data includes, for example, voice, text, character, image and/or sound data. Furthermore, payload data may also include additional information, i.e. metadata, about the block or other data stored in the block. For example, the additional information includes information on the processing of other data stored in the block, such as data format or character encoding, and/or information to characterise other data stored in the block, such as author, licence, etc. In particular, payload data may include, for example, one or more identifiers of the corresponding block and/or the data stored in it, a date of creation of the corresponding block and/or the data stored in it, details of the owner of the block and/or the data stored in it, a public cryptographic key of the owner of the block and/or the data stored in it.

Link data are data which enable the integrity of the payload data to be verified. For example, the link data comprise one or more check values and/or check value portions dependent on the payload data to be verified. By storing the link data in a block other than the block of the blockchain structure whose payload data verifies the link data, a linking, or more precisely a unilateral linking, is implemented between the two blocks. Using the link data, the integrity of the payload data in the other block, for which the link data was generated, may be verified using the block in which the link data is stored. Manipulation of the payload data may be detected by means of the link data.

A backward linking denotes a unidirectional linking to a preceding block in the order of the blockchain structure, i.e. a check value and/or check value portion dependent on the payload data of a block are/is stored in the link data of a preceding block. A forward linking denotes a unidirectional linking to a succeeding block in the order of the blockchain structure, i.e. a check value and/or check value portion dependent on the payload data of a block is stored in the link data of a subsequent block. A combination of backward linking and forward linking between two blocks, wherein a first of the two blocks, i.e. the succeeding block, is cryptographically connected to the second of the two blocks, i.e. the preceding block, by a backward linking and the second block is cryptographically connected to the first block by a forward linking, in the form of a unidirectional linking, results in a bidirectional linking between the two blocks of the blockchain structure.

By means of a mutual storage of link data, i.e. first link data of first payload data of a first block are stored in a second block of the blockchain structure and second link data of second payload data of the second block are stored in the first block of the blockchain structure, a bidirectional linking may be implemented. Thus, the second payload data of the second block may be verified on the basis of the first block and the second link data stored therein, and, vice versa, the first payload data of the first block may be verified on the basis of the second block and the first link data stored therein. This increases the security of the blockchain structure compared to known unidirectionally linked structures, since the blocks protect each other cryptographically via the link data.

The security of the cryptographic connection may be increased by distributed storage of check value portions in the link data of a block of the blockchain structure. According to some embodiments, the distribution scheme of the check value portions in the link data must be known in order to identify those portions of the link data which are check value portions of a check value for the payload data of a specific block of the blockchain structure. This makes manipulations more difficult, for example, because without knowledge of the distribution scheme it is not clear which portions of the link data belong to the payload data of which block of the blockchain structure.

By storing the link data distributed over a plurality of blocks of the blockchain structure in accordance with the backward linking, security may be further increased, since in this case additional manipulation of the plurality of blocks comprising the link data is necessary for manipulation of the payload data. If, in addition, conversely, link data of the payload data of the plurality of blocks are stored in accordance with the forward linking in the block whose link data are stored in the plurality of blocks, a plurality of bidirectional linkings are implemented between one block and a plurality of further blocks of the blockchain structure.

According to some embodiments, to verify the payload data of a block of the blockchain structure, the associated link data is calculated and compared with the link data stored distributed in the blockchain structure for cryptographic protection. According to some embodiments, the calculated link data must match completely with the link data stored in distributed form for a successful verification of the payload data. According to alternative embodiments, the calculated link data does not completely match the link data store in distributed form. For example, a verification is already successful if the degree of conformity reaches a predefined threshold value. Thus, the corresponding payload data have integrity without a probability of 100%, but with a sufficient probability of less than 100%, for example 75%, 80%, 85%, 90%, 95%, 97%, 98% or 99%. For example, the degree of conformity that must be achieved in order for payload data to be considered to have integrity by a user or computer system verifying the integrity of the payload data may be chosen for example by the user or computer system. In particular, such a sufficient degree of conformity may be selected individually for a plurality of payload data of different blocks of the blockchain structure. According to some embodiments the choice of the degree of conformity depends for example on the application, i.e. depends on what the payload data are to be used for and how critical the correctness or integrity of the data is for the corresponding application.

If the link data are stored over a plurality of blocks of the blockchain structure, it may be sufficient to use only a portion of the link data provided by a subset of the plurality of blocks for the comparison, depending on the degree of conformity sufficient for successful verification. According to some exemplary embodiments, the higher the degree of conformity to be achieved, the higher must be the number of blocks of the subgroup which are used for the comparison in order to achieve the corresponding degree of conformity.

Some embodiments may have the advantage that the computational effort required for the comparison as well as the time required for it are lower if fewer blocks of the blockchain structure are to be used for the comparison. Thus, the method may offer the possibility that payload data which are less critical or which are used for less critical applications may be checked more quickly. Nevertheless, it is always possible to perform a complete check, which may prove the integrity of the checked payload data to 100%.

According to some embodiments, the distributed storage of the link data requires the consent of the owner of the block in which the link data or a part of it are/is to be stored. The consent may, for example, take the form of an encryption of the corresponding link data with a private cryptographic key of the owner. According to some embodiments, the blockchain structure comprises a predefined proportion of blocks whose owners are one or more trusted instances or a trust service provider. These blocks are, for example, distributed over the blockchain structure, for example evenly or unevenly, in such a way that, statistically speaking, link data of at least one such block of a trusted owner are required to verify each block of the blockchain structure and/or a predefined minimum proportion of blocks. For example, a minimum degree of conformity is predefined for a successful verification of payload data and is matched to the distribution of blocks of trusted owners in such a way that for a successful verification at least one sequence of link data encrypted with a private key of a trusted owner is to be used for the comparison. For this purpose, the corresponding sequence of link data must be decrypted for example with a public cryptographic key of the trusted owner assigned to the private key. For example, every second, third, fourth, or fifth block is assigned to a trusted owner. This may further increase the security of the method.

Finally, the distributed storage of the link data may also be realised depending on the distance, i.e. the number of blocks arranged in between, between the block whose payload data is to be cryptographically protected and the block of the blockchain structure in which link data for implementing the cryptographic protection are to be stored. For example, the amount of link data stored in a block is indirectly proportional to the previously defined distance, i.e. in other words, the greater the distance, the smaller the amount of link data stored in the corresponding block.

According to some embodiments, each block of the blockchain structure is bidirectionally linked to a plurality of preceding and/or succeeding blocks of the blockchain structure, wherein two bidirectionally linked blocks each comprise link data which are dependent on the payload data of the other block of the two bidirectionally linked blocks.

Some embodiments may have the advantage that the security may be increased by a bidirectional linking to a number of blocks. In this case, successful manipulation of the payload data of one block of the blockchain structure would additionally require manipulation of the link data of a number of other blocks.

According to some embodiments, before the creation of the bidirectional linking the method further includes the steps of:
 dividing the data to be stored into a plurality of data records;
 calculating a check value for each of the data records;
 storing the check values of the data records as link data in the additional block $B_i$;
wherein the storing of the check value portions in the link data comprises in each case an at least partial overwriting of portions of the existing link data.

Some embodiments may have the advantage that the check values are stored in the link data of the same block in which the data to be stored for which the check values have been calculated is also stored. This means, therefore, that it is not only possible to check the integrity of the data stored in the block by means of check values or check value portions which are stored in the link data of other blocks of the blockchain structure. In addition, the link data of the block with the data to be checked may be used for the integrity check. This may enable an initial integrity check based solely on the block with the payload data to be checked. In addition, a check may be performed using the other blocks of the blockchain structure that are bidirectionally linked to the block to be checked. This additionally increases the data security of the stored payload data against manipulation.

According to some embodiments, the division of the data to be stored comprises dividing the data $D_i$ to be stored in the additional block $B_i$ of the blockchain structure into b data records of equal length and a hash value $H_x$ is calculated as check value for each of the data records:

$$H_{x=1,\ldots,b} = H(\ominus_{x=1,\ldots,b}^b(D_i)),$$

where $\ominus_I^r(s)$ is the $I^{th}$ data portion of a character sequence s when the character sequence s is divided into r data portions of equal length and $(H(\ominus_I^r(s)))$ denotes the hash value of the $I^{th}$ data portion.

Some embodiments may have the advantage that they provide an efficient method for calculating the check values of the payload data to be stored.

According to some embodiments, the storage of the check values of the data records further includes:

creating an error correction code for the check values of the data records to be stored;

storing the error correction code as link data in the additional block $B_i$.

An error correction code refers to a bit structure, for example bit sequence, which results from a coding of data, for example link data in the form of check values, and provides information which makes it possible to detect and correct errors in the coded data.

An error correction method is used to create the error correction code. An error correction method is a method which serves to detect and correct errors in the storing of data. To achieve this, an error correction code of the corresponding data, for example link data in the form of check values, is created and includes an additional redundancy, for example in the form of error correction bits, which may be used to determine and correct errors of the corresponding data, for example link data in the form of check values. An error correction bit or parity bit is a bit which is generated in addition to one or more bits of the actual data, for example link data, and which serves to check the integrity of said one or more bits of data.

Exemplary error correction methods, or error correction codes resulting from them, may include one or more of the following methods of codes for example: the Bose Ray Chaudhuri Code (BCH), convolutional code, Fountain Code, Golay Code, Hamming Code, Low Density Parity Check Code (LDPC), MDS Code, Nordstrom Robinson Code (Preparata Code), multidimensional parity checking, the Rank Code, Reed-Muller Code, Reed-Solomon Code (RS), Repeat Accumulate Code (RA), Simplex Code, Slicing by Eight (SB8), Trellis Code Modulation (TCM), Turbo Code (TCC, TPC, etc.), repeat code, woven code, cyclic redundancy checking.

Some embodiments may have the advantage that the use of an error correction code allows the link data of a block of the blockchain structure to be partially overwritten with check values or check value portions of blocks during the course of the forward or backward linkings to which the corresponding block is bidirectionally linked by the forward or backward linkings. The partial overwriting leads to errors in the existing link data, for example the check values of the payload data of the corresponding block or check values or check value portions of previously created bidirectional linkings. The use of the error correction code makes it possible to correct, i.e. reconstruct, the partially overwritten data. Thus, both the partially overwritten data and the data newly added during the overwriting process, i.e. check values or check value portions, may be used for example to check the data integrity of the payload data for which they were calculated.

By using an error correction code, on the one hand the amount of data to be stored in the link data may be reduced, but on the other hand the partial overwriting and addition of the error correction code makes it more difficult to identify which link data belongs to which check value or check value portion or error correction code. Without this knowledge, however, the check values or check value portions provided by the link data may not be manipulated during data manipulation in such a way that this would not be noticed afterwards.

According to some embodiments, the check values to be stored are arranged in two sequences $V_1$ and $V_2$ of the link data and the error correction code is generated as the third sequence $V_3$ of the link data in the form of a bitwise XOR operation of the first two sequences:

$$V_3[x] = \text{XOR}(V_1[x], V_2[x]),$$

where x denotes the $x^{th}$ bit in the particular sequence.

Some embodiments may have the advantage of providing an efficient method for creating the error correction code. An XOR operation, also known as a contravalence, yields 1 if the two bits to be combined are different and yields 0 if the two bits to be combined are identical.

According to some embodiments, an owner is assigned to each block of the blockchain structure, wherein each of the owners is assigned an asymmetric cryptographic key pair comprising a private and a public cryptographic key. The first and second groups with check value portions are each encrypted with the private cryptographic key of the owner assigned to the block of the blockchain structure in whose link data the check value portions of the corresponding group are stored.

Some embodiments may have the advantage that the check value portions are protected against manipulation by encryption. To generate manipulated check value portions, the manipulator would have to obtain the private keys of the corresponding owners. If the groups of check portions are stored distributed over a number of blocks of the blockchain structure, each with different owners, not only one, but a plurality of private keys would be required. Some embodiments may also have the advantage that the check value portions may only be stored in the blocks or their link data with the agreement of the corresponding owners, since only the corresponding owners have the necessary private keys. Finally, encryption may have the further advantage that a reconstruction of the test portions stored in distributed form is made even more difficult, and thus the security against manipulation is further increased. It is true that the encryptions may be decrypted with the public keys of the corresponding asymmetric cryptographic key pairs. However, for decryption, the interrelated data to be decrypted, i.e. check value portions, must first be identified, which is more difficult in the case of encrypted data than in the case of unencrypted data.

According to some embodiments the first and second groups with check value portions are stored distributed bitwise in the link data of the corresponding blocks of the blockchain structure.

Some embodiments may have the advantage that a maximum fine granular distribution and thus an effective mixing of the stored check value portions may be implemented by a bitwise distribution. This may provide a high degree of security against manipulation. In addition, a bitwise error correction method may be used to secure the test value portions.

According to some embodiments, the number of check value portions in the first groups varies in each case depending on the distance of the block of the blockchain structure, in whose link data the check value portions of the corresponding group are stored, from the additional block $B_i$. According to some embodiments, the number of check value portions in the second groups varies in each case depending on the distance of the block of the blockchain structure, from whose payload data the check value portions of the corresponding group were calculated and extracted, from the additional block $B_i$.

Some embodiments may have the advantage that the contribution of the individual blocks to the manipulation protection of payload data of a given block may vary with their distance from the corresponding block, i.e. the number of further blocks arranged between them in the blockchain structure. For example, the contribution may decrease with distance. If the integrity of the payload data to be checked is to be confirmed only up to a certain degree, it may be sufficient to use for the check only a selection of blocks with relevant check value portions.

According to some embodiments, the creation of the bidirectional linking of the additional block $B_i$ comprises a bidirectional linking to k blocks $B_v$ of the blockchain structure with v=i−x and x=1, . . . , k which immediately precede the additional block $B_i$, wherein for backward linking for each of the k blocks $B_v$ backward link data $Ve^{rw}$ are calculated from the data $D_i$ to be stored, with $Ve^{rw}=E(\emptyset_x^1(H(B_i \cdot D_i)), O(B_v) \cdot K_{Pr})$, where $H(B_i \cdot D_i)$ denotes the hash value of the data $D_i$ of block $B_i$, $\emptyset_x^g(s)$ denotes a selection and stringing together of every $x^{th}$ character from a character sequence s starting from the offset g, $O(B_v) \cdot K_{Pr}$ denotes the private cryptographic key $K_{Pr}$ of the owner $O(B_v)$ of the block $B_v$, and E(m, K) denotes a character sequence m encrypted with the cryptographic key K, for the backward link data $Ve^{rw}$ a positioner $Po^{rw}$ for backward linking with $Po^{rw}=E(\emptyset_x^1(H(\oplus(\ominus_2^2(B_i \cdot D_i), \ominus_1^2(B_i \cdot D_i)))), O(B_v) \cdot K_{Pr})$ is calculated and implements a distribution scheme dependent on the data $D_i$ to be stored, wherein $\oplus(s_1, s_2)$ denotes a stringing together of the character sequences $s_1$ and $s_2$, where the link data of the k blocks $B_v$ are each divided into $w \in \mathbb{N}$ portions and the backward linking for each of the k blocks $B_v$ comprises the following method steps starting with p=0, q=1:
1) $q=(((q+Po^{rw}[p]+1) \% w)+1)$, 2) $B_v \cdot V_q[o+p] = Ve^{rw}[p]$ with $o = \left(\sum_{j=1,\ldots,x} \frac{|V_1|}{2^j}\right) + 1$, 3) p=p+1, if $p \leq |Ve^{rw}|$, where $|Ve^{re}|$ is the length of the backward link data $Ve^{rw}$, the backward linking is continued with step 1), otherwise the execution of the backward linking for the corresponding block $B_v$ is terminated, where, for forward linking, for each of the k blocks $B_v$ forward link data $Ve^{vw}$ are calculated from the data $D_v$ of the corresponding block $B_v$, with $Ve^{vw}=E(\emptyset_x^1(H(B_v \cdot D_v)), O(B_i) \cdot K_{Pr})$, for the forward link data $Ve^{rw}$ a positioner $Po^{rw}$ for backward linking with $Po^{vw}=E(\emptyset_x^1(H(\oplus(\ominus_2^2(B_v \cdot D_v), H(\ominus_1^2(B_v \cdot D_v))))), O(B_i) \cdot K_{Pr})$ is calculated, where the link data of the additional block $B_v$ are divided into $w \in \mathbb{N}$ portions and the backward linking for each of the k blocks $B_v$ comprises the following method steps starting with p=0, q=1:
1) $q=(((q+Po^{vw}[p]+1) \% W)+1)$, 2) $B_i \cdot V_q[o+p] = Ve^{rw}[p]$ with $o = \left(\sum_{j=1,\ldots,x} \frac{|V_1|}{2^{j-1}}\right) + 1$, if $x \geq 2$, otherwise $o = 1$, 3) p=p+1, if $p \leq |Ve^{vw}|$, where $|Ve^{vw}|$ is the length of the forward link data $Ve^{rw}$, the method is continued with step 1), otherwise the execution of the forward linking for the corresponding block $B_v$ is terminated, Some embodiments may have the advantage of providing an efficient method for bidirectional linking of the additional block.

The bidirectional linking is achieved, for example, with 2, 3, 4, 5, 7 or 8 blocks of the blockchain structure.

For the backward linking, backward link data $Ve^{rw}$ are calculated from the payload data $D_i$ of the additional block $B_i$ for each of the blocks to which a bidirectional linking is to be established. For this purpose, a hash value is first calculated from the payload data as a check value. Check value portions or characters, i.e. bits, are selected from this hash value. The resulting group of check value portions or bits is encrypted with the private key of the owner of the block of the blockchain structure in whose link data the group of check value portions or bits are to be stored. By calculating the backward link data $Ve^{rw}$, the individual portions or bits of the check value of the payload data are grouped into groups and in each case assigned to one of the blocks to which a bidirectional linking is to be established. This thus results in k data records of backward link data $Ve^{rw}$ for the k blocks, wherein each of the data records with backward link data $Ve^{rw}$ comprises one of the k groups of check value portions into which the check value of the payload data is broken down. The calculation of the backward link data $Ve^{rw}$ thus serves to distribute the check value portions to the k blocks.

Furthermore, a positioner $Po^{rw}$ for backward linking is calculated for each of the data records with backward link data $Ve^{rw}$. For this purpose the payload data $D_i$ of the additional block $B_i$ is mixed. A hash value is first calculated from the mixed payload data. From this hash value, hash value portions or bits are selected. The resulting group of hash value portions or bits is encrypted with the private key of the owner of the block of the blockchain structure in whose link data the backward link data $Ve^{rw}$ for which the positioner $Po^{rw}$ is calculated are to be stored. In this example, the calculation of the positioner $Po^{rw}$ differs from the calculation of the backward link data $Ve^{rw}$ only by the additional mixing of the payload data $D_i$ of the additional block $B_i$. This thus results in two groups or sequences of bits which have the same length but different bit values at the individual positions of the bit sequence. Here, the positioner $Po^{rw}$ is used to determine the distribution of the bits of the backward link data $Ve^{rw}$ in the link data of the associated block of the k blocks of the blockchain structure for which the backward link data $Ve^{rw}$ were calculated.

For each of the k blocks, for example, the following algorithm is executed:

For example, the link data is divided in each case into w=3 portions. The parameter p denotes the bit in the bit sequence of i.e., which is to be stored using the corresponding bit in the bit sequence of $Po^{rw}$ i.e. $Po^{rw}[p]$, in the link data of the corresponding block. The parameter q denotes the portion of the link data of the associated block in which the bit is to be stored. Starting with p=0, q=1, q is calculated first: q=(((q+$Po^{rw}[p]+1$) % 3)+1). In the present case, the value for q in this case is 1, 2 or 3, generally speaking q∈{1, 2, ..., w}. The parameter q could also be initiated with any other integer value. The parameter q determines in which of the w portions $V_q$ of the link data of $B_v$ the corresponding bit of the backward payload data $Ve^{rw}[p]$ is stored: $B_v \cdot V_q[o+p]=Ve^{rw}[p]$. Here, $$o = \left( \sum_{j=1,\ldots,x} \frac{|V_1|}{2^i} \right) + 1$$

denotes an offset which depends on the length of the first portion $V_1$ of the link data of the block $B_v$ and the distance x of the block $B_v$ from the additional block $B_i$. Then the parameter p is incremented, i.e. p. This loop is iterated until all bits of the backward link data $Ve^{rw}$ are distributed.

Similarly, for each of the k blocks $B_v$ a check value of the payload data of the corresponding block is calculated, and a group of check value portions or bits in the form of forward link data $Ve^{vw}$ is selected and stored in the w portions of the link data of the additional block $B_i$ using a positioner $Po^{vw}$ for backward linking.

According to some embodiments, the method further comprises verifying a block of the blockchain structure, wherein the verification comprises the steps of:
dividing the payload data of the block to be verified into a plurality of data records;
calculating a check value for each of the data records;
comparing the calculated check values with the check values of the payload data of the block to be verified which are comprised by the link data of the block to be verified.

According to some embodiments, the verification further comprises reconstructing the check values of the payload data of the block to be verified comprised by the link data using the error correction code.

Some embodiments may have the advantage of providing an efficient method for verifying a block of the blockchain structure or the payload data comprised by the corresponding block. If the check values calculated for the payload data match or sufficiently match the check values stored as link data for the block to be tested, the integrity of the checked payload data may be inferred from this.

In accordance with some embodiments the verification also includes:
calculating at least a part of the check value portions which are created using the payload data of the block to be verified and stored distributed in the link data of those further blocks of the blockchain structure which are bidirectionally linked to the block to be verified;
comparing the calculated check value portions with the stored check value portions, wherein the block to be verified is successfully verified in the case of a match of the compared check value portions.

Some embodiments may have the advantage of providing an efficient method of verifying a block of the blockchain structure or the payload data comprised by the corresponding block using the bidirectionally linked blocks.

According to some embodiments, the calculation of the check values and/or check value portions takes place during the course of the verification using a hash function Some embodiments may have the advantage that an efficient and reliable method for calculating the first and/or second check value is provided. A hash function maps a bit sequence of any length to a bit sequence of fixed length. For example, a SHA algorithm (Secure Hash Algorithm) may be used to calculate the hash value.

According to some embodiments, the calculation of check value portions during the course of the verification comprises the steps of:
encrypting the check value portions in each case with the private cryptographic key of the owner assigned to the block of the blockchain structure in whose link data the corresponding check value portions are stored.

Some embodiments may have the advantage that the distribution of the encrypted check value portions in the link data of the various blocks depends on the result of the encryption. The corresponding distribution scheme is therefore required in order to identify which of the bits comprised by the corresponding link data belong to the check value portions relevant for the check. However, this distribution scheme is dependent on the result of the encryption. Therefore, the calculated check value portions must first be encrypted before they may be checked for conformity with the stored check value portions. However, this encryption is based on the private key of the particular owner of the corresponding block in which the check value portions to be used for the check are stored. A check is therefore only possible with the help of the particular owner, who alone has the necessary private key. Therefore, the check may only be performed with the consent of the corresponding owner.

According to some embodiments, an encryption request with the check value portions to be encrypted is sent to the corresponding owner. The owner checks the request and encrypts the check value portions with his private key. The encrypted check value portions are sent back by the owner to the sender of the encryption request. The sender of the encryption request may check the received encrypted check value portions using the owner's public key. When decrypting with the public key, the unencrypted check value portions sent in the request must be the result if the encryption was performed without errors.

In accordance with some embodiments the data to be stored comprise data which are characterising for the content of a digitally coded document, wherein the provision of the data to be stored comprises a receipt of the data by means of a communications interface via a network from a computer system creating the digitally coded document, the method also comprising the steps of:

receiving a request for a current version of the blockchain structure by means of the communications interface via the network from a requesting computer system;

sending the extended blockchain structure by means of the communications interface via the network to the requesting computer system in response to the received request.

Some embodiments may have the advantage that the integrity of a digitally coded document may be checked on the basis of the data entered in the blockchain structure. Data which are characterising for the content of this document may be calculated for a provided, digitally coded document. For example, a hash value of the content of the digitally coded document may be calculated. These data may be compared with the blockchain structure: If the blockchain structure comprises the corresponding data, the integrity of the digitally coded document is confirmed and this is recognised as authentic. If the blockchain structure does not comprise the corresponding data, the integrity of the digitally coded document is denied. The blockchain structure in this case may offer the advantage that its size may be kept compact if it only comprises hash values of the digitally coded documents. Furthermore, due to the hash values of the digitally coded documents, it is not possible to draw conclusions as to the contents of the corresponding documents, thereby increasing the security. Lastly, a current version of the blockchain structure may be downloaded for example to a potable mobile telecommunications device via the network and may then be used for the checking of digitally coded documents even if there is no network connection available, i.e. the portable mobile telecommunications device is in an offline mode.

A "document" is understood in particular to mean a communication, a text, an attestation, a certificate, or an identification, value or security document, in particular a sovereign document, in particular a paper-based and/or plastic-based document, for example an electronic identification document, in particular a passport, an identity card, visa, driver's licence, vehicle registration certificate, vehicle title, health card, or a corporate identity card, or another ID document, a chip card, payment means, in particular bank note, bank card or credit card, consignment note or another proof of authorisation. In particular, the document may be a machine-readable travel document, as standardised for example by the international civil aviation authority (ICAO) and/or the BSI. An attestation is an explanation in text or written form which affirms a certain fact or circumstance. In addition, the attestation may identify the issuer of the attestation.

A digitally coded document is understood to be a data construct for electronic data processing which comprises digitally coded data. In this case it may be, in particular, an electronic file of any file format, for example a text, table, sound, image and/or video file. In accordance with some embodiments the electronic file may be executable or non-executable. A digitally coded document may be, for example, a document which has been created in or transferred into file form by digitalisation of a document having a physical document body, i.e. a conversion of the data comprised by the physical document body into a binary code. In particular, the validity of such a document is independent of the presence of a fixedly assigned document body.

In accordance with some embodiments a digitally coded document may be created for example by producing a file comprising the data of the corresponding document on a computer. A virtual document may also be created for example by scanning or copying a physical document body, for example a document on paper.

In accordance with some embodiments the data to be stored comprise data of a transaction, wherein the provision of the data to be stored comprises a receipt of the data by means of a communications interface via a network from a computer system involved in the execution of the transaction, the method also comprising the steps of:

receiving a request for a current version of the blockchain structure by means of the communications interface via the network from a requesting computer system;

sending the extended blockchain structure by means of the communications interface via the network to the requesting computer system in response to the received request.

Some embodiments may have the advantage that transactions may be logged on the basis of the data entered in the blockchain structure. The transactions for example may be transactions of a cryptocurrency, a conventional currency, a sale, a dispatch, a transfer of ownership or a handover of an object and/or of a digitally coded document.

In accordance with some embodiments the data to be stored comprise status data of a device, wherein the provision of the data to be stored comprises a receipt of the data by means of a communications interface via a network from a computer system detecting the status data by means of a sensor, the method also comprising the steps of:

receiving a request for a current version of the blockchain structure by means of the communications interface via the network from a requesting computer system;

sending the extended blockchain structure by means of the communications interface via the network to the requesting computer system in response to the received request.

Some embodiments may have the advantage that the status and/or the status history of a device may be logged on the basis of the status data entered in the blockchain structure. Such a device may be, for example, a production device, a component of a computer system, a locking system, an access control device or a vehicle. A "vehicle" in this case is understood to be a mobile means of transport. Such a means of transport may be used, for example, for the transport of goods (traffic of goods), of tools (machines or auxiliaries) or people (passenger transport). Vehicles in particular also comprise motorised means of transport. For example, a vehicle may be a land vehicle, a watercraft and/or an aircraft. A land vehicle may be, for example: an automobile, such as a passenger car, a bus, or a lorry, a motor-operated two-wheeler, such as a motorbike, moped, motor scooter or motor-assisted bicycle, an agricultural tractor, fork-lift truck, golf buggy, or truck-mounted crane. In addition, a land vehicle may also be a rail-mounted vehicle. A watercraft may be, for example: a ship or boat. Furthermore, an aircraft may be, for example: an aeroplane or helicopter. A vehicle is also understood in particular to be a motor vehicle.

A "sensor" is understood here to be an element for capturing measurement data. Measurement data are data which qualitatively or quantitatively reproduce physical or chemical properties of a measurement object, such as heat quantity, temperature, moisture, pressure, sound field dimensions, electromagnetic field strength, brightness, acceleration, position change, pH value, ion strength, electrochemical potential, and/or material composition thereof. Measurement data are detected by means of physical or chemical effects and are converted into an electrical signal suitable for further electronic processing. Measurement data, statuses and/or status changes of electronic devices or those resulting from use by a user may also be reproduced.

In accordance with some embodiments the status data may also comprise data regarding functions performed by the device. For example, manufacturing and/or processing procedures performed by a production device may thus be logged. Furthermore, actions of an access control device for example may be logged, the logged data possibly comprising information regarding times when access has been granted to a secured region via the access control device, and to whom.

Some embodiments relate to an electronic data storage system for the tamper-proof storage of data in a bidirectionally linked blockchain structure,
- wherein the blockchain structure comprises a plurality of blocks, each comprising payload data and link data, wherein the payload data of each block of the blockchain structure is verifiable by means of the link data of a predefined number of blocks of the blockchain structure to which the corresponding block is bidirectionally linked,
- wherein the data storage system comprises a processor and an electronic store with machine-readable instructions, an execution of the machine-readable instructions by the processor prompting the data storage system to execute a method comprising the steps of:
- providing the bidirectionally linked blockchain structure;
- providing the data to be stored;
- creating an additional block $B_i$ to extend the blockchain structure which comprises the data to be stored as payload data;
- creating a bidirectional linking of the additional block $B_i$ with a predefined number of preceding blocks that precede the additional block in the blockchain structure;
- wherein creating the bidirectional linking comprises performing a backward linking of the additional block to the predefined number of preceding blocks and performing a forward linking of the predefined number of preceding blocks to the additional block,
- wherein the backward linking comprises the steps of:
  - calculating a check value of the data to be stored;
  - extracting a number of first groups with check value portions from the check value of the data to be stored, wherein the number of first groups corresponds to the predefined number of preceding blocks;
  - storing the check value portions of the first groups in a manner distributed in the link data of each of the blocks of the predefined number of preceding blocks according to a distribution scheme, the distribution scheme being dependent on the data to be stored,
- wherein the forward linking for each individual block of the predefined number of preceding blocks comprises the steps of:
  - calculating a check value of the payload data of the corresponding preceding block;
  - extracting a second group with check value portions from the check value of the payload data of the corresponding preceding block;
  - storing the check value portions of the second group in a manner distributed in the link data of the additional block according to a distribution scheme, the distribution scheme being dependent on the payload data of the corresponding preceding block.

In accordance with some embodiments the electronic data storage system is configured to execute one or more of the previously mentioned embodiments of the method for tamper-proof storing of data.

In accordance with some embodiments, the electronic data storage system comprises a file system. The file system provides a filing organisation on the data store. Data such as digitally coded documents may be stored as files on the data store. The files may also be read, changed or deleted.

In accordance with some embodiments, the electronic data storage system comprises a database. A database or a database system denotes a system for electronic data management. A database system makes it possible for large data volumes to be stored efficiently, consistently and permanently and for required partial volumes to be provided for users and application programs in different, tailored presentation forms. The database system for example comprises a database management system and a database in the narrower sense or data pool. The database management system provides a management software for managing data of the database. The management software internally organises the structured storage of data and controls all read and write access to the database. The database comprises the volume of data that are to be managed. Data such as digitally coded documents are in this case stored for example as part of the database.

The store may for example comprise a removable store, i.e. a non-fixedly installed, exchangeable and/or portable data carrier for a computer system. Removable stores for example include Blu-ray discs, CDs, floppy discs, DVDs, HD-DVDs, magnetic strips, MO/MODs, solid-state drives (SSDs), memory cards, USB sticks or removable hard drives.

Some embodiments relate to a telecommunications system which comprises an electronic data storage system according to claim 18 and a communications interface for communication via a network, wherein the provision of the data to be stored comprises a receipt of the data by means of a communications interface via a network, the executed method also comprising the steps of:
- receiving a request for a current version of the blockchain structure by means of the communications interface via the network from a requesting telecommunications system;
- sending the extended blockchain structure by means of the communications interface via the network to the requesting telecommunications system in response to the received request.

The telecommunications system is for example a computer system which is configured for communication via a network.

A network may comprise, for example, a local network, in particular a Local Area Network (LAN), a private network, in particular an Intranet, or a Virtual Private Network (VPN). For example, the computer system may comprise a standard radio interface for connection to a WLAN. It may also be a public network, for example the Internet. For example, it may also be a digital cellular mobile communications network.

A "computer system" is understood here to be a device which processes data by means of programmable calculation rules using electronic circuits. A "program" or "program instructions" is understood here without limitation to mean any type of computer program which comprises machine-readable instructions for controlling a functionality of the computer.

A computer system may comprise an interface for connection to the network, the network possibly being a private or public network, in particular the Internet or another communications network. Depending on the embodiment, this connection may also be established via a mobile communications network.

A computer system may be, for example, a mobile telecommunications device, in particular a smartphone, a portable computer, for example a laptop or palmtop computer, a Personal Digital Assistant or the like. For example, it may also be a smartwatch or smartglasses. In addition, it may be a stationary computer system, for example a personal computer or a server incorporated in a client-server environment. In particular, it may be a server with a database management system which manages a database comprising a blockchain structure.

A "store" or "data store" is understood here to mean both a volatile and non-volatile electronic store or digital storage media.

A "non-volatile store" is understood here to mean an electronic store for permanent storing of data. A non-volatile store may be configured as an immutable memory, also referred to as a read-only memory (ROM), or as a changeable memory, also referred to as a non-volatile memory (NVM). In particular, in this case it may be an EEPROM, for example a flash EEPROM, referred to as a flash for short. A non-volatile store is characterised in that the data stored thereon are retained even once the power supply has been switched off.

Here, a "volatile electronic store" is a memory for storage predominantly of data which is characterised in that all data are lost once the power supply is switched off. In particular, it may be a volatile direct access memory, which is also referred to as a random-access memory (RAM), or a volatile main memory of the processor.

A "processor" is understood here and hereinafter to mean a logic circuit used to execute program instructions. The logic circuit may be implemented on one or more separate components, in particular on a chip. In particular, a "processor" is understood to mean a microprocessor or a microprocessor system formed of a number of processor cores and/or a number of microprocessors.

An "interface" or "communications interface" is understood here to mean an interface via which data may be received and sent, the communications interface being of wired or wireless configuration. The communications interface may be an internal interface or an external interface, which for example is connected to an associated device by means of a cable or wirelessly. A communications interface for wireless communication is understood to mean a communications interface which is configured for the contactless sending and receiving of data. The communication may be realised for example in accordance with an RFID and/or NFC standard, such as Bluetooth. The communications interface may also be configured for communication via a local radio network, for example in accordance with a standard from the IEEE-802.11 family and/or Wi-Fi.

An interface may be configured for example as a radio interface which enables communication via a digital cellular mobile radio network which may be constructed in accordance with a mobile radio standard, such as GSM, UMTS, LTE, CDMA or another standard.

Communication may be realised generally for example via a network. A "network" is understood here to mean any transfer medium with a connection for communication which enables communication between at least two computer systems. A network may comprise, for example, a local network, in particular a Local Area Network (LAN), a private network, in particular an Intranet, or a Virtual Private Network (VPN). For example, the computer system may comprise a standard radio interface for connection to a WLAN. It may also be a public network, for example the Internet.

Embodiments of the invention will be explained in greater detail hereinafter with reference to the drawings, in which.

Elements in the subsequent embodiments which correspond to one another are denoted by the same reference signs.

Figure 1:
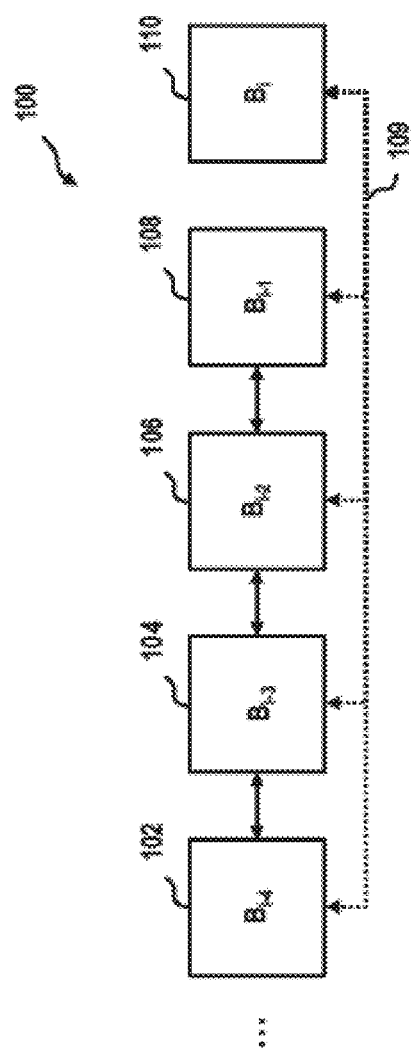
FIG. 1 shows a schematic block diagram of an embodiment of an exemplary blockchain structure.

FIG. 1 shows an embodiment of an exemplary blockchain structure 100 which comprises i−1 blocks 102, 102, 104, 106, 108. These blocks 102, 104, 106, 108 are each bidirectionally linked to a predefined number k of preceding and succeeding blocks of the blockchain structure 100 insofar as k blocks precede and succeed the particular block 102, 104, 106, 108 in the blockchain structure 100. This means the block $B_{i-k-n}$, where $n \in \mathbb{N}^+$ is bidirectionally linked with the blocks $B_{i-(k+1)-n}$ to $B_{i-2k-n}$ and with the blocks $B_{i-(k-1)-n}$ to $B_{i-(n+1)}$. For example, k=4. In that case the block $B_{-1}$ is bidirectionally linked to the blocks $B_{i-2}$ to $B_{i-5}$. The block $B_{i-2}$ is bidirectionally linked to the blocks $B_{i-3}$ to $B_{i-6}$ and to the block $B_{i-1}$. The block $B_{i-3}$ is bidirectionally linked to blocks $B_{i-4}$ to $B_{i-7}$ and to blocks $B_{i-2}$ to $B_{i-1}$. The block $B_{i-4}$ is bidirectionally linked to blocks $B_{i-5}$ to $B_{i-8}$ and to blocks $B_{i-3}$ to $B_{i-1}$.

The blockchain structure 100 is intended to be extended by an additional block 110. For this purpose, bidirectional linkings 109 must be established between the additional block $B_i$ 110 and the existing last k blocks $B_{i-1}$ to $B_{i-k}$ of the blockchain structure 100, if k=4 for example blocks $B_{i-1}$ to $B_{i-4}$ 102, . . . , 108.

For this purpose link data are stored in the blocks $B_{i-1}$ to $B_{i-4}$ 102, . . . , 108 of the blockchain structure 100 and are dependent on the payload data of the additional block $B_i$ 110. Conversely, in the additional block $B_i$ 110, link data are stored which are dependent on the payload data of one of the blocks $B_{i-1}$ to $B_{i-4}$ 102, . . . , 108. Thus, from the link data stored in blocks $B_i$ to $B_{i-4}$ 102, . . . , 110 during the course of the bidirectional linkings, correct check values of the payload data of the corresponding blocks $B_i$ to $B_{i-4}$ 102, . . . , 110 may only be reconstructed as long as the corresponding payload data remain unchanged. In the event of manipulation, for example of the additional block 110, the link data of the blocks $B_{i-1}$ to $B_{i-4}$ 102, . . . , 108 no longer match the payload data of an additional block 110. Furthermore, link data which are dependent on the payload data of the additional block $B_i$ 110 may also be stored in the block $B_i$ 110. A corresponding manipulation may be identified on the basis of the deviation.

Figure 2:
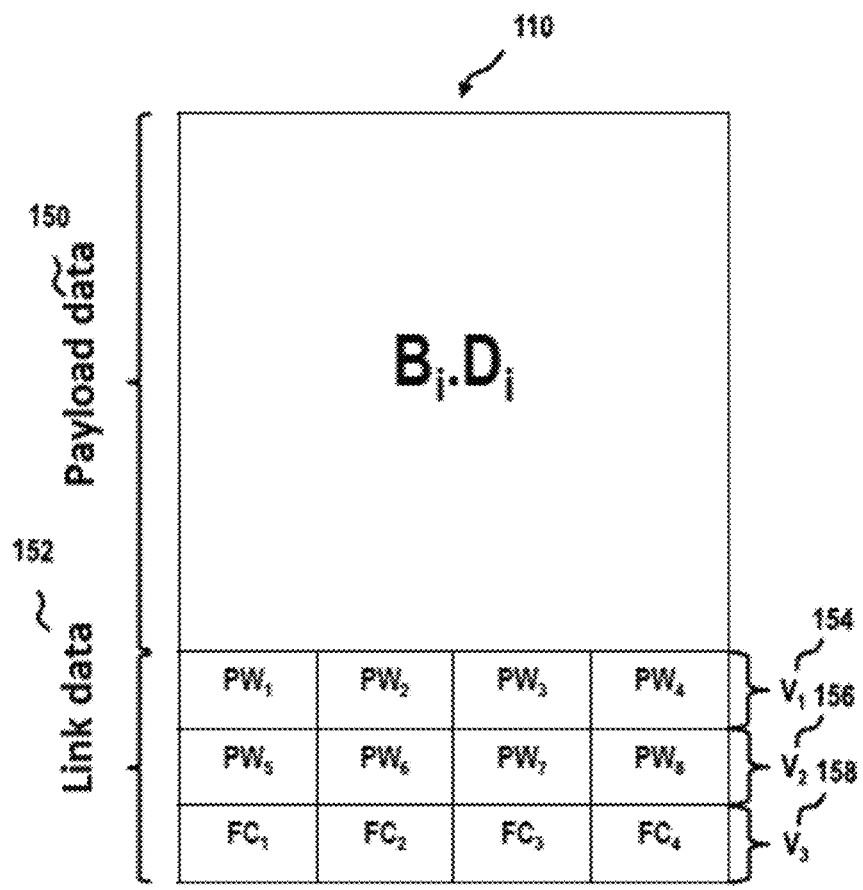
FIG. 2 shows a schematic block diagram of an embodiment of an exemplary block.

FIG. 2 shows an example of block $B_i$ 110 of the blockchain structure 100 from FIG. 1. The other blocks 102, ..., 108 are structured analogously. Block $B_i$ 110 comprises payload data $D_i$ 150 and link data 152. The link data 152 are divided into $w \in \mathbb{N}^+$ portions $V_j$ 154, 156, 158. In the example shown in FIG. 1 there are three portions: $V_1$ 154, $V_2$ 156, $V_3$ 158.

An owner $O(B_i)$ is assigned to block $B_i$ 110 of the blockchain structure 100, which owner creates the block 110, adds the payload data 150 and initialises the link data 152. According to some embodiments, the owner $O(B_i)$ overwrites the link data 152 with the check value portions portion by portion or bit by bit when linking to other blocks to produce a bidirectional linking. For this purpose, the owner $O(B_i)$ is assigned an asymmetric cryptographic key pair $(K_{Pr}, K_{Pr})$, which comprises a private cryptographic key $O(B_i) \cdot K_{Pr}$ and a public cryptographic key $O(B_i) \cdot K_{Pr}$ of the owner $O(B_i)$.

The blockchain structure 100 is a link value $k \in \mathbb{N}^+$ which, for example, is predefined or initially defined for the blockchain structure 100 and determines the number of further blocks with which each block is or will be linked bidirectionally in one direction of the blockchain structure. In the case of k=4, for example, the block $B_i$ 110 is linked to the four preceding and the four succeeding blocks of the blockchain structure 100, provided that the blockchain structure 100 comprises four blocks preceding the block $B_i$ 110 and four blocks succeeding the block $B_i$. The link value k thus defines the distance to which the block $B_i$ is bidirectionally linked to its neighbouring blocks.

To add the block $B_i$ 110 to the blockchain structure 100, check value portions must be stored in the link data of the k preceding and, during the course of the further extension of the blockchain structure 100, in the k succeeding blocks $B_{i-k}$ or $B_{i+k}$ by means of backward or forward linking. For this purpose, the particular owners $O(B_{i-k})$ and $O(B_{i+k})$ of the blocks $B_{i-k}$ and $B_{i+k}$ must give their consent according to some embodiments. For example, the corresponding check value portions must be encrypted with the private cryptographic key $O(B_{i-k}) \cdot K_{Pr}$ or $O(B_{i+k}) \cdot K_{Pr}$ of the particular owners $O(B_{i-k})$ and $O(B_{i+k})$. The owners of the $O(B_{i+k})$ of the succeeding blocks $B_{i+k}$ must successively give their consent when the corresponding blocks $B_{i+k}$ are successively added to blockchain structure 110.

In the portions 154, 156, 158 of the link data 152, for example, check values $PW_1, \ldots, PW_8$ of the data records of the payload data 150 are stored as well as error correction codes $FC_1, \ldots, FC_4$. The payload data 150, for example, are divided into eight data records. For each of the data records, a check value in the form of a hash value $PW_1, \ldots, PW_8$ is calculated using a hash function, for example SHA 512, so that each portion comprises 512 bits, and is stored in the first two portions 154, 156 of the link data 152. For the hash values $PW_1, \ldots, PW_8$, error correction codes are further calculated in pairs by means of an error correction method, for example for each bit $x=1, \ldots, 512$ $FC_m[x]=\text{XOR}(PW_m[x], PW_{m+4}[x])$. The resulting error correction codes $FC_1, \ldots, FC_4$ are stored in the third portions 158 of the link data 152.

To initialise the blockchain structure 100, for example, k blocks with random data are generated, i.e. both the payload data and the initial link data of the k initial blocks are random data. The k initial blocks are generated, for example, by a common owner who initialises the blockchain structure 100. After initialisation, the blockchain structure 100 is ready to receive payload data by adding additional blocks with the corresponding payload data and bidirectionally linking the additional blocks to k existing blocks.

The additional block $B_i$ 110 is added to the blockchain structure 100 with the length $|BC|=i-1$. In doing so, extending the blockchain structure by the additional block $B_i$ 110 first involves generating the corresponding additional block $B_i$ 110. Then, $B_i$ and the last k blocks $B_{i-1}, \ldots, B_{i-k}$ of the blockchain structure 100 are linked bidirectionally to one another by performing a backward and a forward linking between $B_i$ and the last k blocks $B_{i-1}, \ldots, B_{i-k}$.

To generate the additional block $B_i$ 110, the payload data $D_i$ 150 are added to the additional block $B_i$ 110, i.e. $B_i \cdot D_i = D_i$. The added payload data $D_i$ 150 are divided into b data records $\ominus_{x=1,\ldots,b}^{b}(D_i)$, for example of the same length, wherein $\ominus_l^r(s)$ denotes the $l^{th}$ data portion of a character sequence s when the character sequence s is divided into r data portions or data records of equal length. A hash value H is calculated for each of the b data records:

$$H_{x=1,\ldots,b} = H(\ominus_{x=1,\ldots,b}^{b}(D_i)),$$

For example, the payload data $D_i$ are divided into 8 equal portions, and a hash function, such as SHA 512, is applied to each of the resulting data records:

$$H_{x=1,\ldots,8} = H(\ominus_{x=1,\ldots,8}^{8}(D_i)),$$

The resulting hash values are distributed over an even number of portions or sequences, for example two sequences 154, 156 of the link data 152 of the block $B_i$ 110.

The hash values of the first sequence 154 of link data 152 and of the second sequence 156 of link data 152 of the block $B_i$ 110 are linked bit by bit by means of XOR:

$$V_3[x] = \text{XOR}(V_1[x], V_2[x]),$$

where for example $x=1, \ldots, b/n \cdot L$, b is the number of hash values per sequence and L is the length of the hash values. For example $x=1, \ldots, 4 \cdot 512$ with 4 hash values per sequence and a hash value length of 512 bits each. This results, for example, in the four shown error correction codes $FC_1, \ldots, FC_4$ of the third portion $V_3$ 158 of the link data 152 of the block $B_i$ 110.

Once the block $B_i$ 110b has been generated, it must be bidirectionally linked to k blocks of the existing blockchain structure 100 bidirectionally. For this purpose, a backward linking and a forward linking are applied.

The backward linking is carried out by calculating a check value for the payload data $D_i$ of block $B_i$ 110, for example in the form of a hash value, and dividing it into check value portions. The check value portions are combined to form groups, and each group is assigned to one of the k blocks $B_v$ with $v=i-x$, where $x=1, \ldots, k$, and stored in the link data of the corresponding block $B_v$ in distributed form. For this purpose, for each of the k blocks $B_v$, backward link data $Ve^{rw} = E(\emptyset_x^1(H(B_i \cdot D_i)), O(B_v) \cdot K_{Pr})$ and a $Po^{rw} = E(\emptyset_x^1(H(\oplus \ominus_2^2(B_i \cdot D_i), \ominus_1^2(B_i \cdot D_i))))$, $O(B_v) \cdot K_{Pr})$ are calculated from the data $D_i$ to be stored.

To calculate the backward link data $Ve^{rw}$ of the block $B_{v=i-x}$, every $x^{th}$ bit of the hash value of the payload data $D_i$ is selected starting from an offset $o=1$. In this exemplary embodiment, every first bit, i.e. all bits, of the hash value is selected for block $B_{i-1}$, every second bit, i.e. half of the bits, for block $B_{i-2}$, every third bit, i.e. a third of the bits, for block $B_{i-3}$, and every fourth bit, i.e. a quarter of the bits, for block $B_{i-4}$. The number of bits selected therefore decreases as the distance between the block for which they are intended for storage and block $B_i$ 110 increases. In this example, the number of bits is indirectly proportional to the distance The selected bits are strung together to form a group of check value portions or bits and are encrypted with the private cryptographic key $K_{Pr}$ of the owner $O(B_v)$.

To calculate the positioner $Po^{rw}$ for backward linking, the payload data $D_i$ of the additional block $B_i$ 110 are divided into a plurality of r data records, for example r=2. According to some embodiments, the r portions each have the same length. The order of the r data records is changed and the data records are concatenated in the changed order. Concatenation refers to a linking of a plurality of sets to form a new set. The linked set consists of all combinations of elements of both sets using, in particular, a non-commutative linking operation. According to some embodiments, character sequences are concatenated with each other, that is, they are appended to each other to form new character sequences. According to some embodiments, each of the concatenated sets comprises exactly one element, that is, one character sequence. A check value in the form of a hash value, for example with SHA 512, is calculated for the data records concatenated in a changed order.

Every $x^{th}$ bit of the hash value of the mixed payload data $D_i$ from an offset o=1 is selected. In this exemplary embodiment, every first bit, i.e. all bits, of the hash value is selected for block $B_{i-1}$, every second bit, i.e. half of the bits, for block $B_{i-2}$, every third bit, i.e. a third of the bits, for block $B_{i-3}$ and every fourth bit, i.e. a quarter of the bits, for block $B_{i-4}$. In this case, the number of selected bits again decreases with increasing distance from the additional block $B_i$ 110. The selected bits are strung together to form a group of check value portions or bits and are encrypted with the private cryptographic key $K_{Pr}$ of the owner $O(B_v)$.

An offset is calculated for the further procedure, $$o = \left(\sum_{j=1,\ldots,x} \frac{|V_1|}{2^j}\right) + 1$$

where x=1, ..., k. However, any other x-dependent offset o may also be used. The offset o is used for the backward linking, wherein the following method steps are carried out for each of the k blocks $B_v$, starting with p=0, q=1:
1) q=(((q+Po$^{rw}$[p]+1) % 3)+1) in the case of three portions 154, 156, 158 of the link data 152,
2) $B_v \cdot V_q[o+p] = Ve^{rw}[p]$ and
3) p=p+1, if p≤|Ve$^{rw}$|, where |Ve$^{rw}$| is the length of the backward link data Ve$^{rw}$, the backward linking is continued with step 1), otherwise the execution of the backward linking for the corresponding block $B_v$ is terminated, In order to create a bidirectional linking between the additional block $B_i$ 110 and the blocks $B_v$, a forward linking is additionally performed. For each of the k blocks $B_v$ from the data $D_v$ of the corresponding blocks $B_v$, forward link data $Ve^{vw}=E(\emptyset_x^1(H(B_v \cdot D_v)), O(B_i) \cdot K_{Pr})$ as well as a positioner $Po^{vw}$ for $Po^{vw}=E (\emptyset_x^1(H(\oplus(\ominus_2^2(B_v \cdot D_v)), H(\ominus_1^2(B_v \cdot D_v)))), O(B_i) \cdot K_{Pr})$ backward linking are calculated. Furthermore, an offset $$o = \left(\sum_{j=1,\ldots,x} \frac{|V_1|}{2^{j-1}}\right) + 1$$

is calculated if x≥2, otherwise o=1. However, any other x-dependent offset o may also be used. The corresponding offset o is used for the forward linking of each of the k blocks $B_v$ to the additional block $B_i$ 110. Starting with p=0, q=1, the forward linking comprises the following method steps, for example:
1) q=(((q+Po$^{vw}$[p]+1) % w)+1),
2) $B_i \cdot V_q[o+p] = Ve^{vw}[p]$,
3) p=p+1, if p≤|Ve$^{vw}$|, where |Ve$^{vw}$| is the length of the forward link data Ve$^{rw}$, the method is continued with step 1), otherwise the execution of the forward linking for the corresponding block $B_v$ is terminated.

Figure 3:
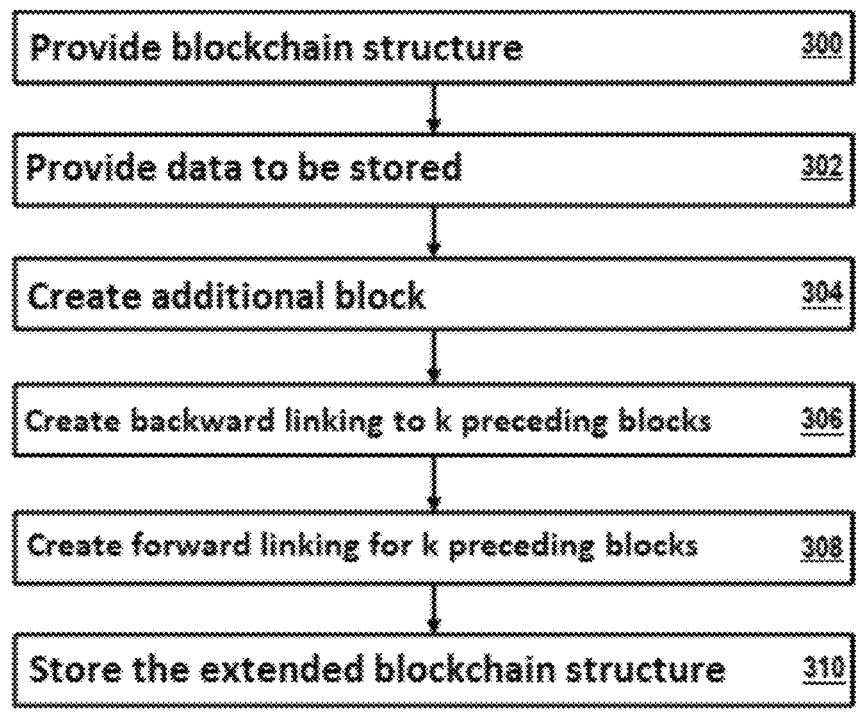
FIG. 3 shows a schematic flow diagram of an exemplary method for extending a bidirectional blockchain structure.

FIG. 3 shows an embodiment of an exemplary method for extending a bidirectionally linked blockchain structure by an additional block. In step 300 the blockchain structure to be extended is provided. In step 302 the data to be stored in the additional block as payload data are provided. In step 304 the additional block for the blockchain structure is created. In this case the data provided in step 302 are stored in the additional block as payload data. Furthermore, check values of the payload data are stored as link data in the additional block. According to embodiments, error correction codes for the check values are additionally stored in the link data of the additional block. In step 306, backward linkings of the payload data of the additional block are created to each of the last k blocks of the blockchain structure. The backward linkings are performed, for example, as explained with regard to FIG. 2. In step 308, forward linkings are created between the payload data of each of the last k blocks and the additional block. The forward linkings are performed, for example, as explained with regard to FIG. 2. The backward and forward linkings of steps 306 and 308 result in k bidirectional linkings of the additional block to the last k blocks of the blockchain structure. In step 310 the extended blockchain structure is lastly stored.

Figure 4:
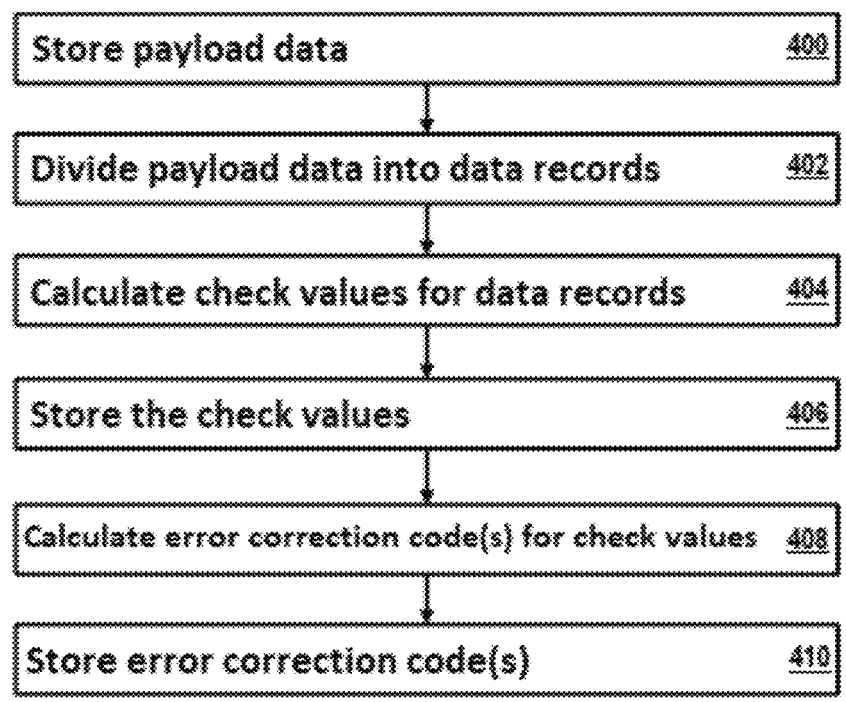
FIG. 4 shows a schematic block diagram of an exemplary method for creating a block.

FIG. 4 shows an embodiment of an exemplary method for creating an additional block for a bidirectionally linked blockchain structure. In step 400 the provided payload data are stored in the additional block. In step 402, the stored payload data are divided into a plurality of data records. In step 404, a check value is calculated for each of the payload data items, for example as a hash value using a hash function. In step 406, the check values of the payload data are stored in the link data of the additional block, for example as explained with regard to FIG. 2. According to some embodiments, the check values are encrypted with a private key of the owner of the additional block before being stored. According to alternative embodiments, the check values are stored unencrypted. In step 408, error correction codes are calculated for the stored check values and in step 410 they are also stored as link data in the additional block. For example, the error correction codes are calculated using bitwise XOR operations of check value pairs.

Figure 5:
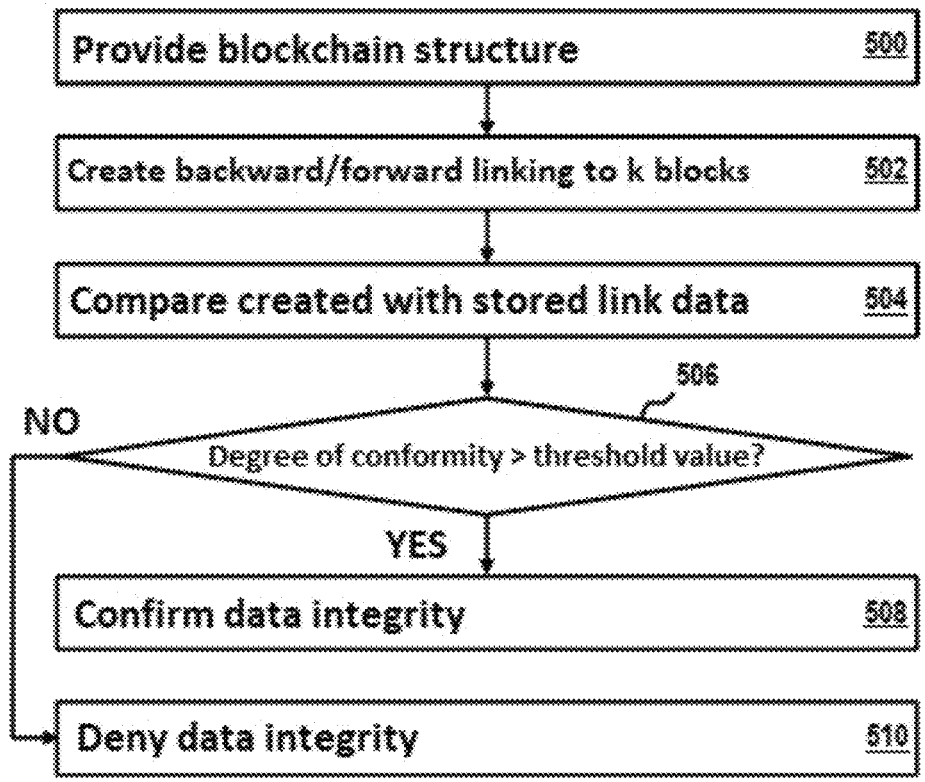
FIG. 5 shows a schematic flow diagram of an exemplary method for checking a block.

FIG. 5 shows an embodiment of an exemplary method for checking a block of a bidirectionally linked blockchain structure. In step 500 a blockchain structure is provided. At least a part of the blockchain structure is provided, which contains the block to be checked and the other blocks bidirectionally linked to the block to be checked. In step 502, the backward link data and/or the forward link data for all or part of the preceding and/or succeeding blocks are calculated from the payload data of the block to be checked. For example, all backward link data for all preceding blocks or all forward link data for all succeeding blocks are calculated. According to further embodiments, both backward link data and forward link data are calculated. According to some embodiments it is defined for which preceding and/or succeeding blocks backward link data and/or forward link data are to be calculated. According to some embodiments it is defined for how many preceding and/or succeeding blocks backward link data and/or forward link data are to be calculated. In step 504 the calculated backward link data and/or forward link data are compared with the corresponding backward link data and/or forward link data of the payload data of the block to be checked stored in the preceding and/or succeeding blocks as link data. For this purpose, a check is made in step 506 as to whether the backward link data and/or forward link data compared with one another have a sufficient degree of conformity which exceeds a predefined threshold value. If this is the case, the data integrity of the payload data of the block to be checked is confirmed in step 508, for example by generating a confirmation signal. If this is the case, the data integrity of the payload data of the block to be checked is denied in step 510 and, for example, an error signal is generated. In addition or alternatively, check values of the payload data of the block to be checked are calculated in step 504, for example. In addition, the complete or error-corrected check values of the payload data of the block being checked are reconstructed from the check values partially stored in the link data using the error correction codes stored in the link data of the block being checked. In step 504 the calculated check values and the check values reconstructed from the stored link data using the error correction codes are compared.

Figure 6:
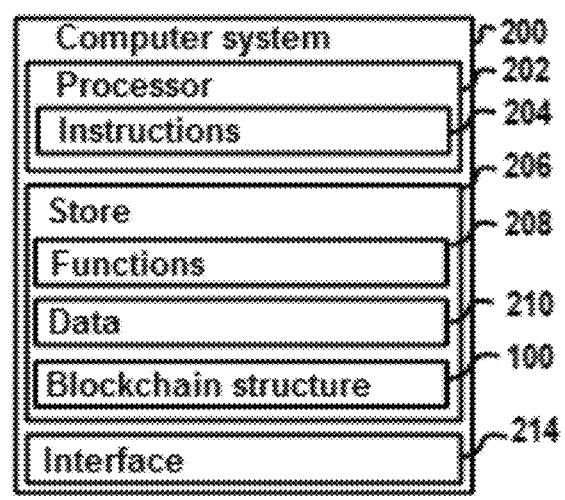
FIG. 6 shows a schematic block diagram of an embodiment of an exemplary data storage system.

FIG. 6 shows a schematic block diagram of an embodiment of an exemplary data storage system 200 in the form of a computer system for tamper-proof storing of data 210 in an electronic store 206 with use of a bidirectionally linked blockchain structure 100.

The computer system 200 comprises a processor 202, which is configured to execute program instructions 204. By execution of the program instructions 204, the processor 202 controls the computer system 200 such that it executes one of the previously described embodiments of the method for the tamper-proof storing of data.

The computer system 200 further comprises a store 206, in which functions 208 for executing backward and/or forward linkings for extending and/or checking the bidirectionally linked blockchain structure 100 are stored. The store 206 additionally comprises data 210 which are to be protected against manipulations or which are to be stored in tamper-proof fashion using a bidirectionally linked blockchain structure 100. For example, the computer system 200 executes one of the methods according to FIGS. 3 and 4 and produces an additional block for the blockchain structure 100, which block comprises the data 210 to be stored in tamper-proof fashion and is linked bidirectionally to the last block of the blockchain structure 100. For the bidirectional linking of the additional block, for example, backward and/or forward linkings are executed using the functions 208.

Lastly, the computer system 200 comprises a communications interface 214. This communications interface 214 for example may be a network interface for communication via a network or an interface for communication with a removable data carrier. For example, the data 210 and/or the blockchain structure 100 may be provided via the communications interface 214. Furthermore, the communications interface 214 may be a user interface for inputting commands by a user and/or for outputting results.

In accordance with some embodiments, the program instructions 204 for example comprise a database management system which manages blockchain structures, such as the blockchain structure 100, stored in the store 206.

Figure 7:
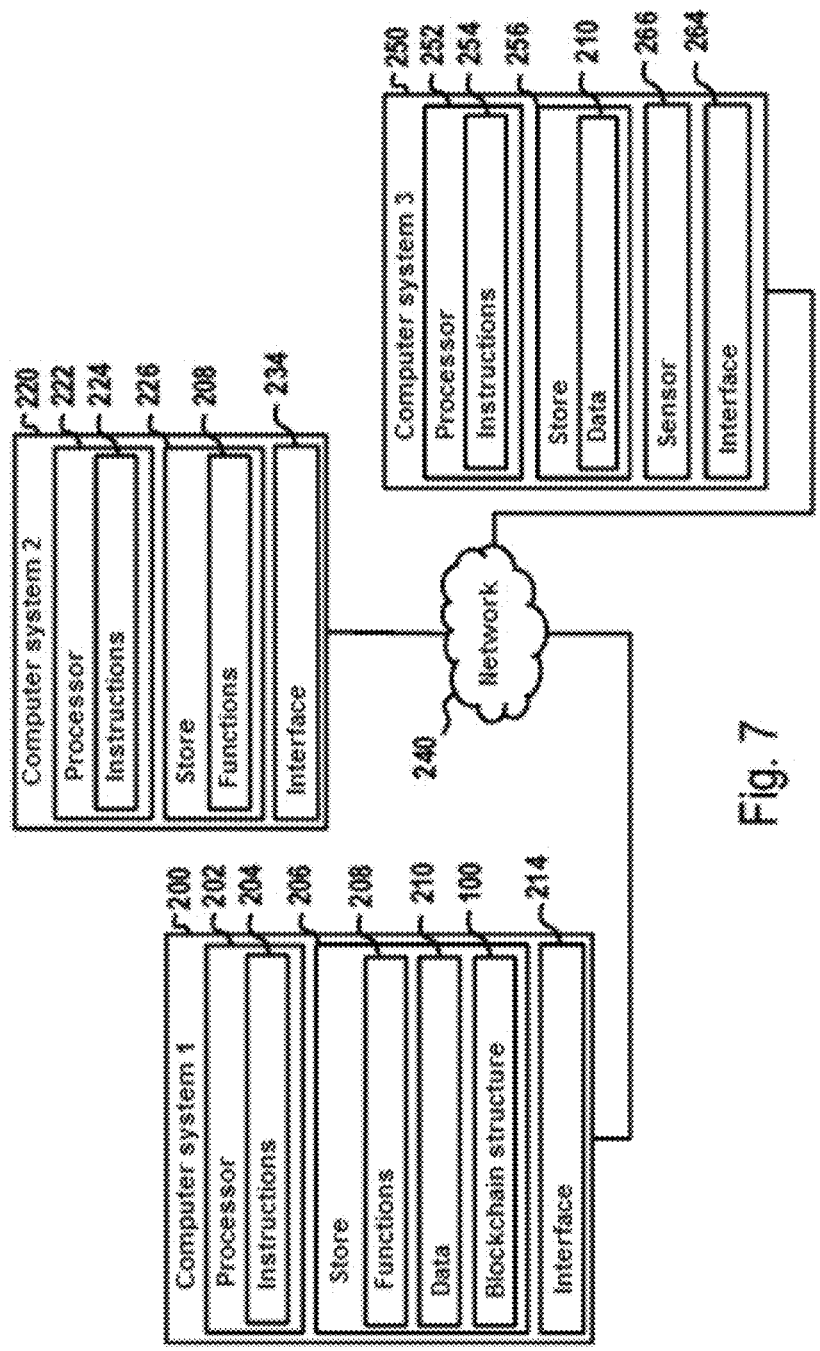
FIG. 7 shows a schematic block diagram of an embodiment of an exemplary telecommunications system.

FIG. 7 shows the exemplary data storage system 200 from FIG. 6 which is configured as a telecommunications system which may communicate by means of the communications interface 214 via the network 240 with other computer systems, such as the computer systems 220, 250. For example, the data 210 are provided from the computer system 250 via the network 240.

The computer system 250 for example comprises a store 256 for storing the data 210 which are to be protected by the computer system 200 against manipulations. In accordance with some embodiments the data 210 are data which are characterising for a digitally coded document. For example, the data 210 are data which are constituted by a hash value of the content of a digitally coded document. In accordance with further embodiments, the data 210 are transaction data of a transaction initiated, logged and/or executed by the computer system 250. In accordance with further embodiments, the data 210 are sensor data which were detected by means of a sensor 266 of the computer system 250. The computer system 250 further comprises a processor 252, which is configured to execute program instructions 254. In accordance with some embodiments, the computer system 250 is likewise configured as a telecommunications system which may communicate with the computer system 200 by means of the communications interface 264 via the network 240. An execution of the program instructions 254 by the processor 252 prompts the computer system 250 for example to send the data 210 to the computer system 200. The sending of the data 210 via the network 240 may be initiated for example in response to a request by the computer system 200 or an initiative by the computer system 250 itself.

FIG. 7 additionally shows the computer system 220, which is likewise configured as a telecommunications system and may communicate with the computer system 200 by means of the communications interface 264 via the network 240. The computer system 220 for example comprises a processor 222 with program instructions 224. The processor 222 is configured to execute the program instructions 224, and an execution of the program instructions 224 by the processor 222 prompts the computer system 220 to request the blockchain structure 100, extended by the data 210, from the computer system 200 via the network. In response to a corresponding request, the computer system 220 for example receives the blockchain structure 100. In accordance with some embodiments, the computer system 220 may read the data stored in the blockchain structure 100. The integrity of the read data may be checked by the computer system 220 for example using the functions 208 stored in the store 226. The backward and/or forward linkings of the blockchain structure 100 which link the blocks of the blockchain structure 100 to one another bidirectionally may be recalculated and checked for consistency and/or integrity using the functions 208. The read data are, for example, data for proving the authenticity of a digitally coded document. The corresponding document is made available to the computer system 220 for example from the computer system 250 via the network 240. If the read data for example are constituted by a hash value of the content of the document, the authenticity of the provided document may thus be checked on the basis of these data. For example, a hash value is calculated for the document by the computer system 220. If the calculated hash value matches the read data, the provided document is accepted as authentic.

LIST OF REFERENCE SIGNS

100 blockchain structure
102 block 104 block
106 block
108 block
109 bidirectional linkings
110 additional block
150 payload data
152 link data
154 portion of the link data
156 portion of the link data
158 portion of the link data
200 computer system
202 processor
204 program instructions
206 store
208 functions
210 data
214 communications interface
220 computer system
222 processor
224 program instructions
226 store
234 communications interface
240 network
250 computer system
252 processor
254 program instructions
256 store
264 communications interface
266 sensor
$PW_1, \ldots, PW_8$ check values
$FC_1, \ldots, FC_4$ error correction codes

The invention claimed is:

1. A method for tamper-proof storing of data in an electronic store using a bidirectionally linked blockchain structure,
wherein the blockchain structure comprises a plurality of blocks, each comprising payload data and link data, wherein the payload data of each block of the blockchain structure are verifiable by means of the link data of a predefined number of blocks of the blockchain structure to which a corresponding block is bidirectionally linked,
the method comprising the steps of:
providing the bidirectionally linked blockchain structure;
providing the data to be stored;
creating an additional block $B_i$ to extend the blockchain structure which comprises the data to be stored as payload data;
creating a bidirectional linking of the additional block $B_i$ to a predefined number of preceding blocks that precede the additional block in the blockchain structure;
wherein creating the bidirectional linking comprises performing a backward linking of the additional block to the predefined number of preceding blocks and performing a forward linking of the predefined number of preceding blocks to the additional block,
where the backward linking comprises the steps of:
calculating a check value of the data to be stored;
extracting a number of first groups with check value portions from the check value of the data to be stored, wherein the number of first groups corresponds to the predefined number of preceding blocks;
storing the check value portions of the first groups in distributed form in the link data of each of the blocks of the predefined number of preceding blocks according to a distribution scheme, the distribution scheme being dependent on the data to be stored,
wherein the forward linking for each individual block of the predefined number of preceding blocks comprises the steps of:
calculating a check value of the payload data of a corresponding preceding block;
extracting a second group with check value portions from the check value of the payload data of the corresponding preceding block;
storing the check value portions of the second group in distributed form in the link data of the additional block according to a distribution scheme, the distribution scheme being dependent on the payload data of the corresponding preceding block.

2. The method according to claim 1, wherein each block of the blockchain structure is bidirectionally linked to a plurality of preceding and/or succeeding blocks of the blockchain structure, wherein two bidirectionally linked blocks each comprise link data which are dependent on the payload data of another block of the two bidirectionally linked blocks.

3. The method according to claim 1, wherein the method, prior to creating the bidirectional linking, further comprises the steps of:
dividing the data to be stored into a plurality of data records;
calculating a check value for each of the data records;
storing the check values of the data records as link data in the additional block $B_i$;
wherein the storing of the check value portions in the link data comprises in each case an at least partial overwriting of portions of existing link data.

4. The method according to claim 3, wherein the dividing of the data to be stored comprises a dividing of the data $D_i$ to be stored in the additional block $B_i$ of the blockchain structure into b data records of equal length, and
wherein a hash value $H_x$ is calculated as check value for each of the data records:

$$H_{x=1,\ldots,b} = H(\ominus_{x=1,\ldots,b}^b(D_i)),$$

where $\ominus_1^r(s)$ is the $1^{th}$ data portion of a character sequence s when the character sequence s is divided into r data portions of equal length and $H(\ominus_1^r(s))$ denotes the hash value of the $1^{th}$ data portion.

5. The method according to claim 3, wherein the storing of the check values of the data records further comprises the steps of:
creating an error correction code for the check values of the data records to be stored;
storing the error correction code as link data in the additional block $B_i$.

6. The method according to claim 5, wherein the check values to be stored are arranged in two sequences $V_1$ and $V_2$ of the link data and the error correction code is generated as a third sequence $V_3$ of the link data in the form of a bitwise XOR operation of the first two sequences:

$$V_3[x] = XOR(V_1[x], V_2[x]),$$

where x denotes an $x^{th}$ bit in a particular sequence.

7. The method according to claim 1, wherein each block of the blockchain structure is assigned an owner, wherein each of the owners is assigned an asymmetric cryptographic key pair comprising a private and a public cryptographic key, wherein the first and second groups with check value portions are each encrypted with the private cryptographic key of the owner assigned to the block of the blockchain structure in whose link data the check value portions of the corresponding group are stored.

8. The method according to claim 1, wherein the first and second groups with check value portions are each stored bitwise distributed in the link data of corresponding blocks of the blockchain structure.

9. The method according to claim 1, wherein the number of check value portions in the first groups varies in each case depending on a distance of a block of the blockchain structure, in whose link data the check value portions of the corresponding group are stored, from the additional block $B_i$, and wherein the number of check value portions in the second groups varies in each case as a function of the distance of the block of the blockchain structure, from whose useful data the check value portions of the corresponding group have been calculated and extracted, from the additional block $B_i$.

10. The method according to claim 9, wherein the creation of the bidirectional linking of the additional block $B_i$ comprises a bidirectional linking to k blocks $B_v$ of the blockchain structure with v=i−x and x=1, . . . , k which immediately precede the additional block $B_i$, wherein for backward linking for each of the k blocks $B_v$ backward link data $Ve^{rw}$ are calculated from the data $D_i$ to be stored, with $$Ve^{rw}=E(\emptyset_x^1(H(B_i \cdot D_i)), O(B_v) \cdot K_{Pr}),$$

where $H(B_i \cdot D_i)$ denotes a hash value of the data $D_i$ of block $B_i$, $\emptyset_x^g(s)$ denotes a selection and stringing together of every $x^{th}$ character from a character sequence s starting at offset g, $O(B_v) \cdot K_{Pr}$ denotes a private cryptographic key $K_{Pr}$ of an owner $O(B_v)$ of the block $B_v$ and $E(m, K)$ denotes a character sequence m encrypted with the cryptographic key K, for the backward link data $Ve^{rw}$ a positioner $Po^{rw}$ for backward linking with $$Po^{rw}=E(\emptyset_x^1(H(\oplus(\ominus_2^2(B_i \cdot D_i), \ominus_1^2(B_i \cdot D_i)))), O(B_v) \cdot K_{Pr})$$

is calculated and implements a distribution scheme dependent on the data $D_i$ to be stored, wherein $\oplus(s_1, s_2)$ denotes a sequence of the character sequences $s_1$ and $s_2$, where the link data of the k blocks $B_v$ are each stored in $w \in \mathbb{N}$ portions, and wherein the backward link for each of the k blocks $B_v$ comprises the following method steps starting with p=0, q=1:

1) q=(((q+$Po^{rw}$[p]+1) % w)+1),

2) $B_v \cdot V_q[o + p] = Ve^{rw}[p]$ with $o = \left(\sum_{j=1,\ldots,x} \frac{|V_1|}{2^i}\right) + 1$, 3) p=p+1, if p≤|$Ve^{rw}$|, where |$Ve^{rw}$| is the length of the backward link data $Ve^{rw}$, the backward linking is continued with step 1), otherwise the execution of the backward linking for the corresponding block $B_v$ is terminated, wherein for forward linking for each of the k blocks $B_v$ forward link data $Ve^{vw}$ is calculated from the data $D_v$ of the corresponding block $B_v$ with $$Ve^{vw}=E(\emptyset_x^1(H(B_v \cdot D_v)), O(B_i) \cdot K_{Pr}),$$

for the forward link data $Ve^{rw}$ a positioner $Po^{rw}$ for backward linking with $$Po^{vw}=E(\emptyset_x^1(H(\oplus(\ominus_2^2(B_v \cdot D_v), H(\ominus_1^2(B_v \cdot D_v)))), O(B_i) \cdot K_{Pr})$$

is calculated, where the link data of the additional block $B_i$ are divided into $w \in \mathbb{N}$ portions and the forward linking for each of the k blocks $B_v$ comprises the following method steps starting with p=0, q=1:

1) q=(((q+$Po^{vw}$[p]+1) % w)+1),

2) $B_i \cdot V_q[o + p] = Ve^{rw}[p]$ with $o = \left(\sum_{j=1,\ldots,x} \frac{|V_1|}{2^i}\right) + 1$, if $x \geq 2$, otherwise $o = 1$, 3) p=p+1, if p≤|$Ve^{vw}$|, where |$Ve^{vw}$| is the length of the forward link data $Ve^{rw}$, the method is continued with step 1), otherwise the execution of the forward linking for the corresponding block By is terminated.

11. The method according to claim 1, wherein the method further comprises verifying a block of the blockchain structure, wherein the verification comprises the steps of:

dividing the payload data of the block to be verified into a plurality of data records;

calculating a check value for each of the data records;

comparing the calculated check values with the check values of the payload data of the block to be verified, wherein the check values of the payload data of the block to be verified are reconstructed from the link data of the block to be verified using an error correction code.

12. The method according to claim 11, wherein the verification also comprises the steps of:

calculating at least a part of the check value portions which are created using the user data of the block to be verified and are stored in distributed form in the link data of those further blocks of the blockchain structure which are linked bidirectionally to the block to be verified, comparing the calculated check value portions with the stored check value portions, wherein the block to be verified is successfully verified in the case of a match of the compared check value portions.

13. The method according to claim 11, wherein the calculation of the check values and/or check value portions is carried out during the course of the verification using a hash function.

14. The method according to claim 11, wherein the calculation of the check value portions during the course of the verification comprises the steps of:

encrypting the check value portions in each case with the private cryptographic key of the owner assigned to the block of the blockchain structure in whose link data the corresponding check value portions are stored.

15. The method according to claim 1, wherein the data to be stored comprise data which are characterising for content of a digitally coded document, the providing the data to be stored comprising a receipt of the data by means of a communications interface via a network from a computer system creating the digitally coded document, the method also comprising the steps of:
- receiving a request for a current version of the blockchain structure by means of the communications interface via the network from a requesting computer system;
- sending the extended blockchain structure by means of the communications interface via the network to the requesting computer system in response to the received request.

16. The method according to claim 1, wherein the data to be stored comprise data of a transaction, the providing the data to be stored comprising a receipt of the data by means of a communications interface via a network from a computer system involved in the execution of the transaction, the method also comprising the steps of:
- receiving a request for a current version of the blockchain structure by means of the communications interface via the network from a requesting computer system;
- sending the extended blockchain structure by means of the communications interface via the network to the requesting computer system in response to the received request.

17. The method according to claim 1, wherein the data to be stored comprise status data of a device, the providing the data to be stored comprising a receipt of the data by means of a communications interface via a network from a computer system detecting the status data by means of a sensor, the method also comprising the steps of:
- receiving a request for a current version of the blockchain structure by means of the communications interface via the network from a requesting computer system;
- sending the extended blockchain structure by means of the communications interface via the network to the requesting computer system in response to the received request.

18. An electronic data storage system for tamper-proof storing of data in a bidirectionally linked blockchain structure,
- wherein the blockchain structure comprises a plurality of blocks, each comprising payload data and link data, wherein the payload data of each block of the blockchain structure are verifiable by means of the link data of a predefined number of blocks of the blockchain structure to which a corresponding block is bidirectionally linked,
- wherein the data storage system comprises a processor and an electronic store with machine-readable instructions, wherein an execution of the machine-readable instructions by the processor prompts the data storage system to execute a method comprising the steps of:
    - providing the bidirectionally linked blockchain structure;
    - providing the data to be stored;
    - creating an additional block $B_i$ to extend the blockchain structure which comprises the data to be stored as payload data;
    - creating a bidirectional linking of the additional block $B_i$, to a predefined number of preceding blocks that precede the additional block in the blockchain structure; wherein creating the bidirectional linking comprises performing a backward linking of the additional block to the predefined number of preceding blocks and performing a forward linking of the predefined number of preceding blocks to the additional block,
    - where the backward linking comprises the steps of:
        - calculating a check value of the data to be stored;
        - extracting a number of first groups with check value portions from the check value of the data to be stored, wherein the number of first groups corresponds to the predefined number of preceding blocks;
        - storing of the check value portions of the first groups in distributed form in the link data of each of the blocks of the predefined number of preceding blocks according to a distribution scheme, the distribution scheme being dependent on the data to be stored,
    - wherein the forward linking for each individual block of the predefined number of preceding blocks comprises the steps of:
        - calculating a check value of the payload data of a corresponding preceding block;
        - extracting a second group with check value portions from the check value of the payload data of the corresponding preceding block;
        - distributed storage of the check value portions of the second group in the link data of the additional block according to a distribution scheme, the distribution scheme being dependent on the payload data of the corresponding preceding block.

19. A telecommunications system which comprises an electronic data storage system for tamper-proof storing of data in a bidirectionally linked blockchain structure and a communications interface for communication via a network,
- wherein the blockchain structure comprises a plurality of blocks, each comprising payload data and link data, wherein the payload data of each block of the blockchain structure are verifiable by means of the link data of a predefined number of blocks of the blockchain structure to which a corresponding block is bidirectionally linked,
- wherein the data storage system comprises a processor and an electronic store with machine-readable instructions, wherein an execution of the machine-readable instructions by the processor prompts the data storage system to execute a method comprising the steps of:
    - providing the bidirectionally linked blockchain structure;
    - providing the data to be stored;
    - creating an additional block $B_i$ to extend the blockchain structure which comprises the data to be stored as payload data;
    - creating a bidirectional linking of the additional block $B_i$ to a predefined number of preceding blocks that precede the additional block in the blockchain structure; wherein creating the bidirectional linking comprises performing a backward linking of the additional block to the predefined number of preceding blocks and performing a forward linking of the predefined number of preceding blocks to the additional block,
    - where the backward linking comprises the steps of:
        - calculating a check value of the data to be stored;
        - extracting a number of first groups with check value portions from the check value of the data to be stored, wherein the number of first groups corresponds to the predefined number of preceding blocks;
        - storing of the check value portions of the first groups in distributed form in the link data of each of the blocks of the predefined number of preceding blocks according to a distribution scheme, the distribution scheme being dependent on the data to be stored, wherein the forward linking for each individual block of the predefined number of preceding blocks comprises the steps of:

calculating a check value of the payload data of a corresponding preceding block;

extracting a second group with check value portions from the check value of the payload data of the corresponding preceding block;

distributed storage of the check value portions of the second group in the link data of the additional block according to a distribution scheme, the distribution scheme being dependent on the payload data of the corresponding preceding block, wherein the providing the data to be stored comprises a receipt of the data by means of the communications interface via the network, the executed method also comprising the steps of:

receiving a request for a current version of the blockchain structure by means of the communications interface via the network from a requesting telecommunications system;

sending the extended blockchain structure by means of the communications interface via the network to the requesting telecommunications system in response to the received request.

* * * * *